US009477453B1

(12) United States Patent
Ince et al.

(10) Patent No.: US 9,477,453 B1
(45) Date of Patent: Oct. 25, 2016

(54) TECHNOLOGIES FOR SHADOW STACK MANIPULATION FOR BINARY TRANSLATION SYSTEMS

(71) Applicant: Intel Corporation, Santa Clara, CA (US)

(72) Inventors: Tugrul Ince, Santa Clara, CA (US);
Koichi Yamada, Los Gatos, CA (US);
Paul Caprioli, Hillsboro, OR (US);
Jiwei Lu, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/748,363

(22) Filed: Jun. 24, 2015

(51) Int. Cl.
*G06F 9/45* (2006.01)
*G06F 12/08* (2016.01)

(52) U.S. Cl.
CPC .............. *G06F 8/52* (2013.01); *G06F 12/0873* (2013.01)

(58) Field of Classification Search
CPC ... G06F 9/45504; G06F 9/45537; G06F 8/52
USPC .......................................................... 717/138
See application file for complete search history.

(56) References Cited

U.S. PATENT DOCUMENTS

| 5,930,509 | A | * | 7/1999 | Yates | ..................... | G06F 9/4552 |
| | | | | | | 717/146 |
| 2013/0346978 | A1 | * | 12/2013 | Jiang | ................... | G06F 9/45533 |
| | | | | | | 718/1 |
| 2014/0229717 | A1 | * | 8/2014 | Venkat | ..................... | G06F 21/52 |
| | | | | | | 712/225 |
| 2016/0092673 | A1 | * | 3/2016 | LeMay | .................. | G06F 21/52 |
| | | | | | | 718/1 |

FOREIGN PATENT DOCUMENTS

| WO | 2014/133520 | A1 | 9/2014 |
| WO | 2014/189510 | A1 | 11/2014 |
| WO | 2015/030748 | A1 | 3/2015 |

OTHER PUBLICATIONS

Moshe Bach et al., "Analyzing Parallel Programs with pin," Computer 43.3, 2010, at 34-41 (8 pages).
Raymond J. Hookway & Mark A. Herdeg, "Digital FX!32: Combining Emulation and Binary Translation," Digital Technical Journal vol. 9, No. 1, 1997, at 3-12 (10 pages).
Lap Chung Lam & Tzi-Cker Chiueh, "A General Dynamic Information Flow Tracking Frame Work for Security Applications," 22nd Annual Comp. Sci. Applications Conf., 2006, at 463-72 (10 pages).

\* cited by examiner

*Primary Examiner* — John Chavis
(74) *Attorney, Agent, or Firm* — Barnes & Thornburg LLP

(57) ABSTRACT

Technologies for shadow stack management include a computing device that, when executing a translated call routine in a translated binary, pushes a native return address on to a native stack of the computing device, adds a constant offset to a stack pointer of the computing device, executes a native call instruction to a translated call target, and, after executing the native call instruction, subtracts the constant offset from the stack pointer. Executing the native call instruction pushes a translated return address onto a shadow stack of the computing device. The computing device may map two or more virtual memory pages of the shadow stack onto a single physical memory page. The computing device may execute a translated return routine that pops the native return address from the native stack, adds the constant offset to the stack pointer, and executes a native return instruction. Other embodiments are described and claimed.

25 Claims, 4 Drawing Sheets

US 9,477,453 B1

TECHNOLOGIES FOR SHADOW STACK MANIPULATION FOR BINARY TRANSLATION SYSTEMS

BACKGROUND

Typical computing devices support execution of binary code including instructions targeted to a particular instruction set architecture (ISA). Binary translation systems generate a translated binary based on an original or native binary. Binary translation may be used to execute a binary targeted to a particular ISA on a computing device that supports a different ISA, without recompiling the original binary. Additionally or alternatively, binary translation may be used to take advantage of new instructions or other features supported by a particular computing device but not included in the original binary, to increase performance through dynamic optimization, to enforce security policies, or for other purposes.

Most processors support native call and return instructions, which are used to perform subroutine calls and returns and are very common in compiled binaries. Many processors include specialized hardware used to optimize calls and returns, such as a stack-based return prediction hardware (e.g., a return stack buffer). Many binary translation systems cannot directly use native call and return instructions without breaking compatibility, and thus emulate call and return instructions with jump instructions. However, using jump instructions may not take advantage of optimized call/return hardware of the processor. To allow the use of native call and return instructions, some binary translation systems maintain a shadow stack in memory. However, typical shadow stack implementations require several expensive memory load and/or store instructions to switch between the native stack and the shadow stack. For example, a typical implementation of a translated call routine may execute four load/store operations: storing the value of the stack pointer to a native stack save area, loading the value of the stack pointer from a shadow stack save area, perform the call instruction, storing the new value of the stack pointer to the shadow stack save area, and loading the value of the stack pointer from the native stack save area.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
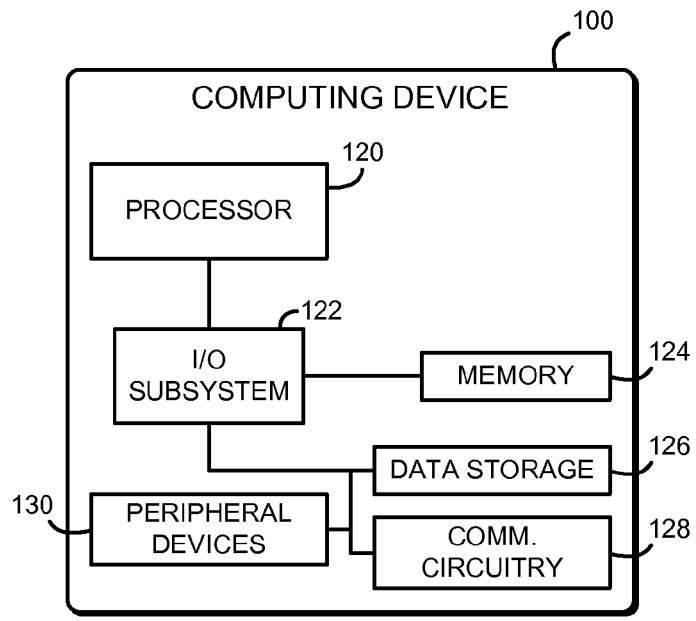
FIG. 1 is a simplified block diagram of at least one embodiment of a computing device for shadow stack manipulation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for shadow stack manipulation includes a binary translation system. In use, as described in more detail below, the computing device 100 generates and executes a translated binary based on a native binary. The native binary includes one or more call and/or return instructions, and the translated binary includes corresponding translated call routines and translated return routines, respectively. The computing device 100 performs translated calls and returns using native call and return instructions that reference a shadow stack in virtual memory. The shadow stack is located at a constant offset in virtual memory from the native stack of the computing device 100. In some embodiments, the computing device 100 may map the virtual memory pages of the shadow stack on to a reduced number of physical pages. The computing device 100 may improve performance of call and return routines in the binary translation system by avoiding the execution of several memory load and store instructions. Additionally, the computing device 100 may reduce memory consumption by mapping the shadow stack onto a reduced number of physical memory pages. Mapping the shadow stack onto a reduced number of physical pages may also improve binary translation performance by improving the cache hit rate for shadow stack memory references.

The computing device 100 may be embodied as any type of computation or computer device capable of performing the functions described herein, including, without limitation, a computer, a desktop computer, a workstation, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 122, a memory 124, a data storage device 126, and communication circuitry 128. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processors 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store binary executable files, native binaries, or other binary data used to encode computer programs.

The communication circuitry 128 of the computing device 100 may be embodied as any communication circuit, device, or collection thereof, capable of enabling communications between the computing device 100 and other remote devices over a network. The communication circuitry 128 may be configured to use any one or more communication technology (e.g., wired or wireless communications) and associated protocols (e.g., Ethernet, Bluetooth®, Wi-Fi®, WiMAX, etc.) to effect such communication.

In some embodiments, the computing device 100 may also include one or more peripheral devices 130. The peripheral devices 130 may include any number of additional input/output devices, interface devices, and/or other peripheral devices. For example, the peripheral devices 130 may include typical input/output devices such as a display, keyboard, mouse, touchscreen, and/or other peripheral devices.

Figure 2:
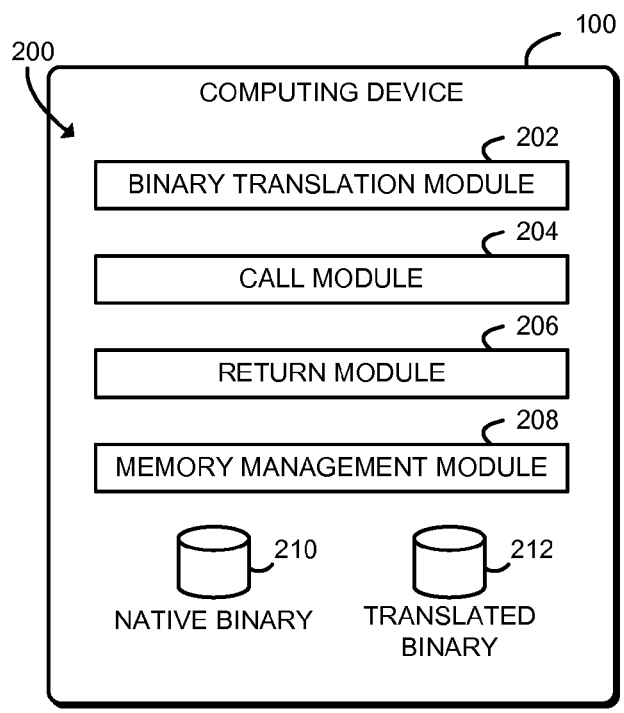
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes a binary translation module 202, a call module 204, a return module 206, and a memory management module 208. The various modules of the environment 200 may be embodied as hardware, firmware, software, or a combination thereof. For example the various modules, logic, and other components of the environment 200 may form a portion of, or otherwise be established by, the processor 120 or other hardware components of the computing device 100. As such, in some embodiments, any one or more of the modules of the environment 200 may be embodied as a circuit or collection of electrical devices (e.g., a binary translation circuit, a call circuit, etc.).

The binary translation module 202 is configured to process a native binary 210 and generate and execute a translated binary 212 based on the native binary 210. The translated binary 212 may include one or more translated call routines and translated return routines corresponding to native call instructions and native return instructions of the native binary 210, respectively. Each translated call routine is associated with a translated call target within the translated binary 212, and each translated call target corresponds to a native call target of the corresponding native call instruction. In some embodiments, the binary translation module 202 may be configured to check whether a stack pointer of the computing device 100 exceeds a pre-allocated virtual address range associated with the shadow stack, as described further below.

The call module 204 is configured to execute call routines of the translated binary 212. In particular, the call module 204 is configured to push a native return address on to a native stack of the computing device 100, add a constant offset to a stack pointer of the computing device 100 in response to pushing the native return address on to the native stack, and execute a native call instruction to the translated call target in response to adding the constant offset to the stack pointer. The stack pointer may be embodied as an architecturally defined register of the processor 120 such as RSP or ESP. Executing the native call instruction causes the processor 120 to push a translated return address on to a shadow stack of the computing device 100. The call module 204 is further configured to subtract the constant offset from the stack pointer in response to execution of the native call instruction.

The return module 206 is configured to execute return routines of the translated binary 212. In particular, the return module 206 is configured to pop the native return address from the native stack, add the constant offset to the stack pointer in response popping the native return address from the native stack, and execute a native return instruction in response to adding of the constant offset to the stack pointer. Executing the native return instruction causes the processor 120 to pop a translated return address from the shadow stack and jump to that translated return address. The return module 206 is further configured to subtract the constant offset from the stack pointer in response to execution of the native return instruction. Additionally, in some embodiments the return module 206 may be configured to validate the translated return address in response to execution of the native return instruction. Validating the translated return address verifies that the translated return address corresponds to the native return address previously popped from the native stack.

The memory management module 208 is configured to map multiple virtual memory pages of the shadow stack onto a fewer number of physical memory pages. For example, all virtual memory pages of the shadow stack may be mapped onto a single physical memory page. Collisions between shadow stack entries may be detected and corrected by validating the translated return address as described above.

Figure 3:
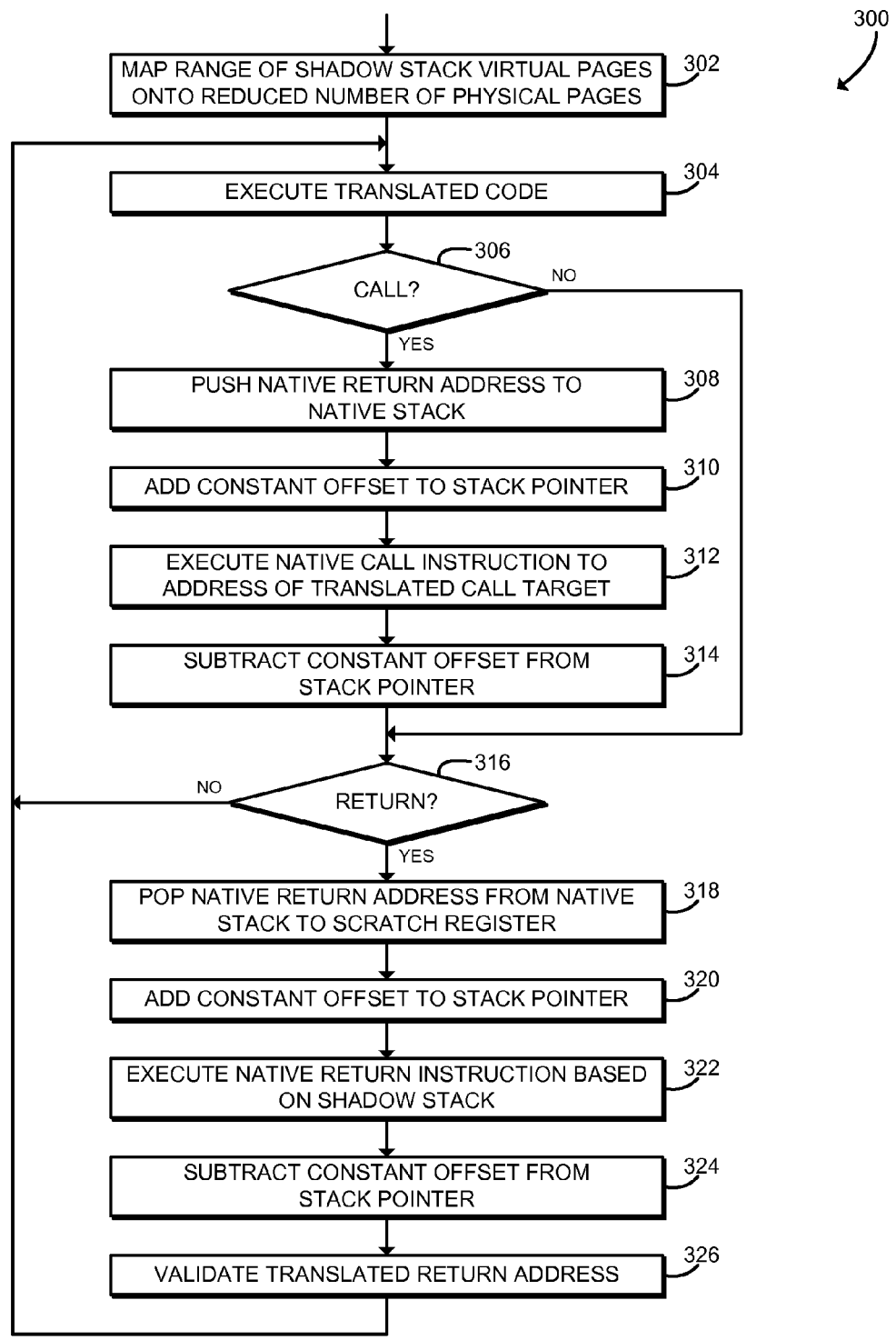
FIG. 3 is a simplified flow diagram of at least one embodiment of a method for shadow stack manipulation that may be executed by the computing device of FIGS. 1 and 2.

Referring now to FIG. 3, in use, the computing device 100 may execute a method 300 for shadow stack manipulation. The method 300 begins with block 302, in which the computing device 100 may map a range of multiple virtual memory pages of the shadow stack onto a reduced number of physical pages. For example, the computing device 100 may map all virtual pages associated with the shadow stack onto a single physical page. By mapping multiple virtual pages onto a single physical page, the computing device 100 may reduce the amount of physical memory 124 required to store the shadow stack. Of course, mapping multiple virtual pages onto a single physical page introduces the risk of collisions; that is, the risk that multiple entries in the shadow stack will occupy the same physical memory location. However, the shadow stack is usually sparsely populated with data and the risk of collision may be low. Collisions may be detected and/or corrected by a return address validation procedure described below in connection with block 326 and FIG. 5. Additionally, although described as mapping the virtual memory pages as a part of the method 300, it should be understood that the computing device 100 may map the virtual memory pages at another time or as part of another process. For example, the virtual memory pages may be mapped by an operating system of the computing device 100 in response to a page fault, or at any other appropriate time. The computing device 100 may map the virtual memory pages prior to storing any data in the shadow stack, to prevent potential data loss.

In block 304, the computing device 100 executes translated code from the translated binary 212. As described above, the computing device 100 may translate part or all of the native binary 210 into the translated binary 212 and then execute code from the translated binary 212. The translated code may include binary code adapted for execution on the processor 120, for example binary code adapted to the particular processor architecture of the processor 120 or binary code using specialized processor instructions or other features supported by the processor 120.

In block 306, the computing device 100 determines whether a translated call operation is being executed. The computing device 100 may use any method to determine whether a call operation is being executed. For example, in some embodiments the computing device 100 may determine at translation time that a call operation should be executed and then include a call routine or other instructions in the translated binary 212 at the location of the call operation. In some embodiments, the computing device 100 may detect the call routine dynamically. If a call operation is not being executed, the method 300 skips ahead to block 316, described below. If a call operation is being executed, the method 300 advances to block 308.

In block 308, the computing device 100 pushes the native return address for the translated call operation onto the native stack of the computing device 100. The native return address is the return address that would be pushed onto the native stack by a corresponding call instruction of the native binary 210. For example, the return address may be the address of the next instruction following the call instruction in the native binary 210 (e.g., the next sequential value of the instruction pointer register of the processor 120). The computing device 100 may determine the native return address at translation time. The computing device 100 may push the native return address onto the native stack by writing the value of the native return address into memory at a memory location identified by a stack pointer register of the processor 120, for example by executing a PUSH instruction with the processor 120.

In block 310, the computing device 100 adds a constant offset to the stack pointer register (e.g., RSP or ESP) of the processor 120. After adding the constant offset, the stack pointer register points to a location in memory corresponding to the shadow stack. The constant offset may be embodied as any constant integer value representing the distance between the native stack and the shadow stack in virtual memory, and may be selected based on the virtual memory layout used by the operating system, applications, or other executable code of the computing device 100. The computing device 100 may add the constant offset to the stack pointer using an arithmetic instruction, without requiring an additional memory load or store (e.g., by using an ADD instruction including the constant offset as an immediate value). In some embodiments, the computing device 100 may perform a stack bound check operation to ensure that the new value of the stack pointer does not exceed a pre-allocated virtual address range of the shadow stack.

In block 312, the computing device 100 executes a native call instruction to the address of the translated call target. Executing the native call instruction causes the processor 120 to push a translated return address onto the shadow stack, because the stack pointer register of the processor 120 has been updated to point to the shadow stack. The translated return address corresponds to the next instruction in the translated binary 212 following the native call instruction (e.g., the next sequential value of the instruction pointer register of the processor 120).

After executing the call instruction, the processor 120 continues execution of the method 300 from the translated call target in block 314, in which the computing device 100 subtracts the constant offset from the stack pointer register (e.g., RSP or ESP). Thus, after subtracting the constant offset, the stack pointer register points to the native stack of the computing device 100. The computing device 100 may subtract the constant offset from the stack pointer using an arithmetic instruction, without requiring an additional memory load or store (e.g., by using a SUB instruction including the constant offset as an immediate value). After restoring the native stack, the method 300 proceeds to block 316, in which the computing device 100 may continue executing the translated binary 212 as described further below.

Figure 4:
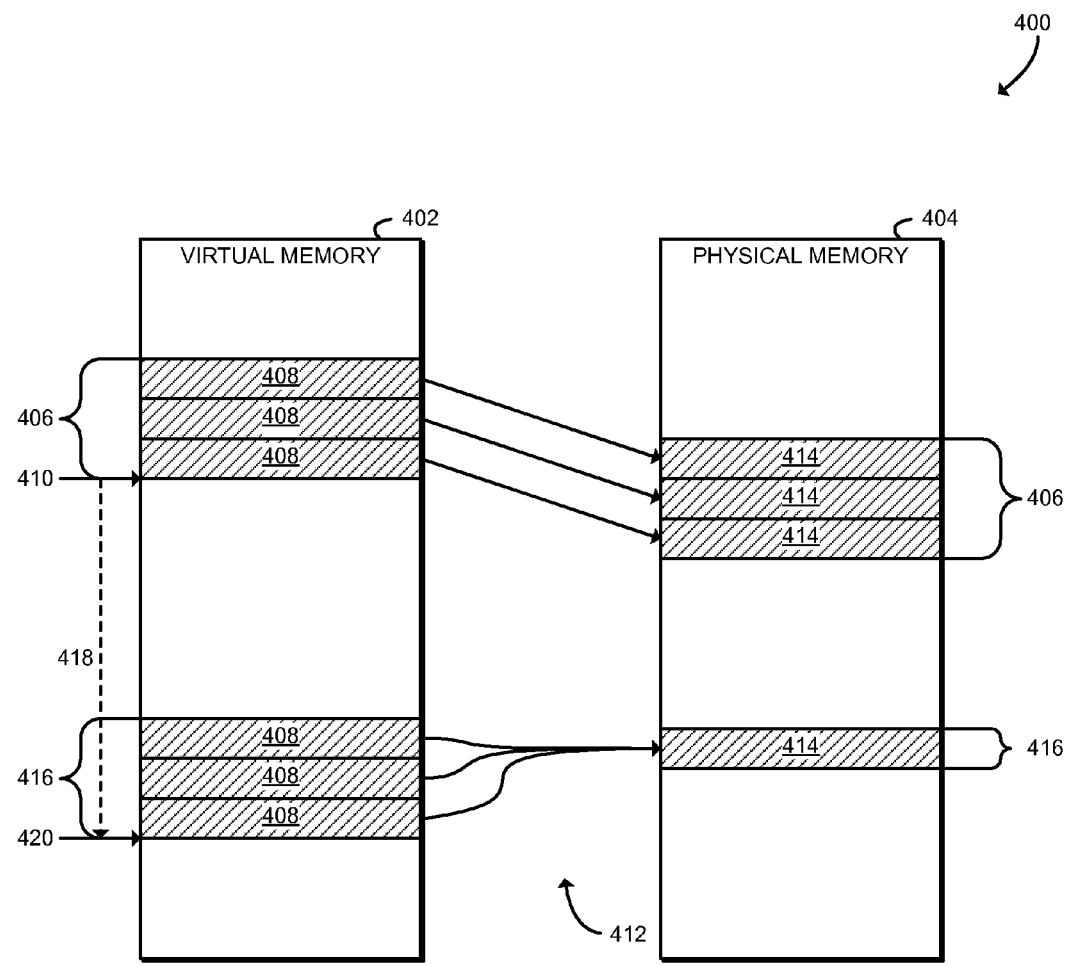
FIG. 4 is a schematic diagram illustrating a memory management layout that may be established by the computing device of FIGS. 1 and 2.

Referring now to FIG. 4, a schematic diagram 400 illustrates one potential embodiment of a memory management layout that may be established by the computing device 100. As shown, the computing device 100 establishes a virtual memory space 402 and a physical memory space 404. The virtual memory space 402 includes a native stack 406. As shown, the native stack 406 includes several virtual pages 408. In use, the stack pointer register of the processor 120 may include the address 410 of the top of the native stack 406.

The computing device 100 maintains a set of page mappings 412 to map memory pages between the virtual memory space 402 and the physical memory space 404. The page mappings 412 may be embodied as, for example, page table entries in page tables maintained by an operating system of the computing device 100. As shown, each of the virtual pages 408 of the native stack 406 maps to a physical page 414 in the physical memory space 404. The native stack 406 may occupy the same amount of memory in both the virtual memory space 402 and the physical memory space 404.

As shown in FIG. 4, the virtual memory space 402 further includes a shadow stack 416. The shadow stack is located in the virtual memory space 402 at a constant offset 418 from the native stack 406. Thus, adding the constant offset 418 to the address 410 of the top of the native stack 406 results in the address 420 of the top of the shadow stack 416. Accordingly, the shadow stack 416 may occupy the same amount of virtual memory space as the native stack 406. Illustratively, each of the virtual pages 408 of the shadow stack 416 maps to a single physical page 414 in the physical memory space 404. Thus, the shadow stack 416 occupies less memory in the physical memory space 404 as compared to the virtual memory space 402.

Referring again to FIG. 3, in block 316 the computing device 100 determines whether a translated return operation is being executed. The computing device 100 may use any method to determine whether a return operation is being executed. For example, in some embodiments the computing device 100 may determine at translation time that a return operation should be executed and then include a return routine or other instructions in the translated binary 212 at the location of the return operation. In some embodiments, the computing device 100 may detect the return routine dynamically. If a return operation is not being executed, the method 300 loops back to block 304 to continue executing the translated binary 212. If a return operation is being executed, the method 300 advances to block 318.

In block 318, the computing device 100 pops the native return address from the native stack into a scratch register of the processor 120. As described above in connection with block 306, the native return address may have been previously pushed onto the native stack by a translated call routine. The computing device 100 may pop the native return address from the native stack by reading the value of the native return address from memory at a memory location identified by the stack pointer register of the processor 120, for example by executing a POP instruction with the processor 120. The scratch register may be embodied as any temporary storage location accessible by the processor 120. To improve performance, the scratch register contents may be accessible without executing additional memory loads and/or stores.

In block 320, the computing device 100 adds the constant offset to the stack pointer register (e.g., RSP or ESP) of the processor 120. The computing device 100 adds the same offset described above in connection with block 308. Thus, after adding the constant offset, the stack pointer points to a location in memory corresponding to the shadow stack. The computing device 100 may add the constant offset to the stack pointer using an arithmetic instruction, without requiring an additional memory load or store (e.g., by using an ADD instruction including the constant offset as an immediate value).

In block 322, the computing device 100 executes a native return instruction. Executing the native return instruction causes the processor 120 to pop a translated return address from the shadow stack, because the stack pointer register of the processor 120 has been updated to point to the shadow stack. After popping the translated return address, executing the native return instruction causes the processor 120 to jump to the translated return address.

After executing the native return instruction, the processor 120 continues execution of the method 300 in block 324, in which the computing device 100 subtracts the constant offset from the stack pointer register (e.g., RSP or ESP). Thus, after subtracting the constant offset, the stack pointer register points to the native stack of the computing device 100. The computing device 100 may subtract the constant offset from the stack pointer using an arithmetic instruction, without requiring an additional memory load or store (e.g., by using a SUB instruction including the constant offset as an immediate value).

In block 326, the computing device 100 validates the translated return address. As described above, in some embodiments, mapping multiple virtual pages of the shadow stack onto a single physical page may cause collisions between shadow stack entries. If a collision exists, executing the native return instruction may cause the computing device 100 to jump to an incorrect translated return address. Validating the translated return address determines whether the translated return address matches the native return address popped from the native stack and stored in the scratch register as described above in connection with block 318. If the translated return address does not match, the computing device 100 jumps to the correct translated return address. The computing device 100 may use any appropriate return target validation mechanism provided by the binary translation system. One potential embodiment of a method for return target validation is described below in connection with FIG. 5. As another example, the computing device 100 may use a translation time branch target validation technique described in International Patent Application Publication No. WO 2014/189510 A1. After validating the translated return address, the method 300 loops back to block 304 to continue executing the translated binary 212.

Figure 5:
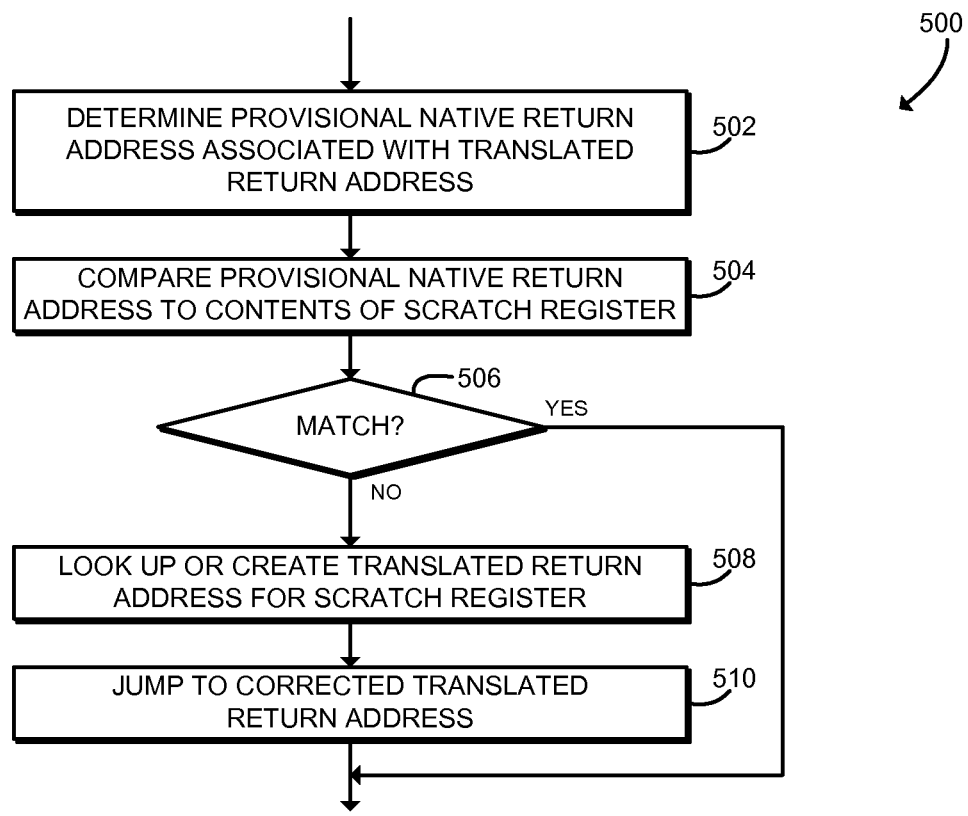
FIG. 5 is a simplified flow diagram of at least one embodiment of a method for translated return address verification that may be executed by the computing device of FIGS. 1 and 2.

Referring now to FIG. 5, in use, the computing device 100 may execute a method 500 for translated return address validation. The method 500 begins with block 502, in which the computing device 100 determines a provisional native return address associated with the current translated return address. The current translated return address corresponds to the return address popped from the shadow stack as described above in connection with block 324 of FIG. 3. The current translated return address may be determined, for example, based on the contents of the instruction pointer register of the processor 120. The provisional native return address is the address within the native binary 210 corresponding to the translated return address. The relationship between translated return addresses and native return addresses may be determined by the computing device 100 at translation time.

In block 504, the computing device 100 compares the provisional native return address to the contents of the scratch register. As described above in connection with block 318 of FIG. 3, the scratch register stores data popped from the native stack at the beginning of the translated call operation. In block 506, the computing device 100 determines whether the provisional native return address matches the contents of the scratch register. If so, then the translated return address has been successfully validated and the method 500 is completed. As described above in connection with FIG. 3, the computing device 100 may continue executing the translated binary 212 starting from the translated return address. If the provisional native return address and the contents of the scratch register do not match, then the method 500 advances to block 508.

In block 508, the computing device 100 looks up or creates the translated return address based on the contents of the scratch register. The computing device 100 uses the binary translation system to look up a translated return address in the translated binary 212 corresponding to the native return address stored in the scratch register. If no such translated return address exists, the computing device 100 may generate appropriate translated code in the translated binary 212. In block 510, the computing device 100 jumps to the corrected translated return address determined as described above in connection with block 508. After jumping to the translated return address, the translated return address has been successfully validated and the method 500 is completed. As described above in connection with FIG. 3, the computing device 100 may continue executing the translated binary 212 starting from the corrected translated return address.

EXAMPLES

Illustrative examples of the technologies disclosed herein are provided below. An embodiment of the technologies may include any one or more, and any combination of, the examples described below.

Example 1 includes a computing device for shadow stack management, the computing device comprising a call module to push a native return address on to a native stack of the computing device; add a constant offset to a stack pointer of the computing device in response to pushing of the native return address on to the native stack; execute a native call instruction to a translated call target in response to addition of the constant offset to the stack pointer; and subtract the constant offset from the stack pointer in response to execution of the native call instruction; and a processor to push a translated return address on to a shadow stack of the computing device in response to execution of the native call instruction.

Example 2 includes the subject matter of Example 1, and further including a memory management module to map a plurality of virtual memory pages of the shadow stack onto a first physical memory page.

Example 3 includes the subject matter of any of Examples 1 and 2, and further including a binary translation module to execute a translated call routine of a translated binary, wherein the translated call routine corresponds to a native call instruction of a native binary and the translated call target corresponds to a native call target of the native call instruction; wherein to push the native return address comprises to push the native return address in response to execution of the translated call routine.

Example 4 includes the subject matter of any of Examples 1-3, and wherein the binary translation module is further to generate the translated binary as a function of the native binary, wherein the translated binary includes the translated call routine; and execute the translated binary; wherein to execute the translated call routine comprises to execute the translated call routine in response to execution of the translated binary.

Example 5 includes the subject matter of any of Examples 1-4, and further including a binary translation module to check whether the stack pointer exceeds a pre-allocated virtual address range associated with the shadow stack in response to the addition of the constant offset to the stack pointer.

Example 6 includes the subject matter of any of Examples 1-5, and further including a return module to pop the native return address from the native stack of the computing device in response to subtraction of the constant offset from the stack pointer; add the constant offset to the stack pointer in response to popping of the native return address from the native stack; execute a native return instruction in response to addition of the constant offset to the stack pointer in response to the popping of the native return address from the native stack; and subtract the constant offset from the stack pointer in response to execution of the native return instruction; wherein the processor is further to pop the translated return address from the shadow stack in response to execution of the native return instruction.

Example 7 includes the subject matter of any of Examples 1-6, and further including a memory management module to map a plurality of virtual memory pages of the shadow stack onto a first physical memory page; wherein the return module is further to validate the translated return address in response to execution of the native return instruction.

Example 8 includes the subject matter of any of Examples 1-7, and wherein to pop the native return address from the native stack comprises to pop the native return address into a first register of the computing device; and to validate the translated return address comprises to determine a provisional native return address associated with the translated return address; determine whether the provisional native return address matches the first register of the computing device; determine a corrected translated return address based on the contents of the first register in response to a determination that the provisional native return address does not match the first register; and jump to the corrected translated return address in response to determination of the corrected translated return address.

Example 9 includes the subject matter of any of Examples 1-8, and wherein to determine the corrected translated return address comprises to determine whether a translated binary includes a translated return address for the native return address represented by the contents of the scratch register; and generate the translated binary including the translated return address as a function of a native binary in response to a determination that the translated binary does not include the translated return address for the native return address represented by the contents of the scratch register.

Example 10 includes the subject matter of any of Examples 1-9, and further including a binary translation module to execute a translated return routine of a translated binary, wherein the translated return routine corresponds to a native return instruction of a native binary; wherein to pop the native return address comprises to pop the native return address in response to execution of the translated return routine.

Example 11 includes the subject matter of any of Examples 1-10, and further including a binary translation module to (i) generate the translated binary as a function of the native binary, wherein the translated binary includes the translated return routine and (ii) execute the translated binary; wherein to execute the translated return routine comprises to execute the translated return routine in response to execution of the translated binary.

Example 12 includes a method for shadow stack management, the method comprising pushing, by a computing device, a native return address on to a native stack of the computing device; adding, by the computing device, a constant offset to a stack pointer of the computing device in response to pushing the native return address on to the native stack; executing, by the computing device, a native call instruction to a translated call target in response to adding the constant offset to the stack pointer, wherein executing the native call instruction comprises pushing a translated return address on to a shadow stack of the computing device; and subtracting, by the computing device, the constant offset from the stack pointer in response to executing the native call instruction.

Example 13 includes the subject matter of Example 12, and further including mapping, by the computing device, a plurality of virtual memory pages of the shadow stack onto a first physical memory page.

Example 14 includes the subject matter of any of Examples 12 and 13, and further including executing, by the computing device, a translated call routine of a translated binary, wherein the translated call routine corresponds to a native call instruction of a native binary and the translated call target corresponds to a native call target of the native call instruction; wherein pushing the native return address comprises pushing the native return address in response to executing the translated call routine.

Example 15 includes the subject matter of any of Examples 12-14, and further including generating, by the computing device, the translated binary as a function of the native binary, wherein the translated binary includes the translated call routine; and executing, by the computing device, the translated binary; wherein executing the translated call routine comprises executing the translated call routine in response to executing the translated binary.

Example 16 includes the subject matter of any of Examples 12-15, and further including checking, by the computing device, whether the stack pointer exceeds a pre-allocated virtual address range associated with the shadow stack in response to adding the constant offset to the stack pointer.

Example 17 includes the subject matter of any of Examples 12-16, and further including popping, by the computing device, the native return address from the native stack of the computing device in response to subtracting the constant offset from the stack pointer; adding, by the computing device, the constant offset to the stack pointer in response to popping the native return address from the native stack; executing, by the computing device, a native return instruction in response to adding the constant offset to the stack pointer in response to popping the native return address from the native stack, wherein executing the native return instruction comprises popping the translated return address from the shadow stack; and subtracting, by the computing device, the constant offset from the stack pointer in response to executing the native return instruction.

Example 18 includes the subject matter of any of Examples 12-17, and further including mapping, by the computing device, a plurality of virtual memory pages of the shadow stack onto a first physical memory page; and validating, by the computing device, the translated return address in response to executing the native return instruction.

Example 19 includes the subject matter of any of Examples 12-18, and wherein popping the native return address from the native stack comprises popping the native return address into a first register of the computing device; and validating the translated return address comprises determining a provisional native return address associated with the translated return address; determining whether the provisional native return address matches the first register of the computing device; determining a corrected translated return address based on the contents of the first register in response to determining that the provisional native return address does not match the first register; and jumping to the corrected translated return address in response to determining the corrected translated return address.

Example 20 includes the subject matter of any of Examples 12-19, and wherein determining the corrected translated return address comprises determining whether a translated binary includes a translated return address for the native return address represented by the contents of the scratch register; and generating the translated binary including the translated return address as a function of a native binary in response to determining that the translated binary does not include the translated return address for the native return address represented by the contents of the scratch register.

Example 21 includes the subject matter of any of Examples 12-20, and further including executing, by the computing device, a translated return routine of a translated binary, wherein the translated return routine corresponds to a native return instruction of a native binary; wherein popping the native return address comprises popping the native return address in response to executing the translated return routine.

Example 22 includes the subject matter of any of Examples 12-21, and further including generating, by the computing device, the translated binary as a function of the native binary, wherein the translated binary includes the translated return routine; and executing, by the computing device, the translated binary; wherein executing the translated return routine comprises executing the translated return routine in response to executing the translated binary.

Example 23 includes a computing device comprising a processor; and a memory having stored therein a plurality of instructions that when executed by the processor cause the computing device to perform the method of any of Examples 12-22.

Example 24 includes one or more machine readable storage media comprising a plurality of instructions stored thereon that in response to being executed result in a computing device performing the method of any of Examples 12-22.

Example 25 includes a computing device comprising means for performing the method of any of Examples 12-22.

Example 26 includes a computing device for shadow stack management, the computing device comprising means for pushing a native return address on to a native stack of the computing device; means for adding a constant offset to a stack pointer of the computing device in response to pushing the native return address on to the native stack; means for executing a native call instruction to a translated call target in response to adding the constant offset to the stack pointer, wherein executing the native call instruction comprises pushing a translated return address on to a shadow stack of the computing device; and means for subtracting the constant offset from the stack pointer in response to executing the native call instruction.

Example 27 includes the subject matter of Example 26, and further including means for mapping a plurality of virtual memory pages of the shadow stack onto a first physical memory page.

Example 28 includes the subject matter of any of Examples 26 and 27, and further including means for executing a translated call routine of a translated binary, wherein the translated call routine corresponds to a native call instruction of a native binary and the translated call target corresponds to a native call target of the native call instruction; wherein the means for pushing the native return address comprises means for pushing the native return address in response to executing the translated call routine.

Example 29 includes the subject matter of any of Examples 26-28, and further including means for generating the translated binary as a function of the native binary, wherein the translated binary includes the translated call routine; and means for executing the translated binary; wherein the means for executing the translated call routine comprises means for executing the translated call routine in response to executing the translated binary.

Example 30 includes the subject matter of any of Examples 26-29, and further including means for checking whether the stack pointer exceeds a pre-allocated virtual address range associated with the shadow stack in response to adding the constant offset to the stack pointer.

Example 31 includes the subject matter of any of Examples 26-30, and further including means for popping the native return address from the native stack of the computing device in response to subtracting the constant offset from the stack pointer; means for adding the constant offset to the stack pointer in response to popping the native return address from the native stack; means for executing a native return instruction in response to adding the constant offset to the stack pointer in response to popping the native return address from the native stack, wherein executing the native return instruction comprises popping the translated return address from the shadow stack; and means for subtracting the constant offset from the stack pointer in response to executing the native return instruction.

Example 32 includes the subject matter of any of Examples 26-31, and further including means for mapping a plurality of virtual memory pages of the shadow stack onto a first physical memory page; and means for validating the translated return address in response to executing the native return instruction.

Example 33 includes the subject matter of any of Examples 26-32, and wherein the means for popping the native return address from the native stack comprises means for popping the native return address into a first register of the computing device; and the means for validating the translated return address comprises means for determining a provisional native return address associated with the translated return address; means for determining whether the provisional native return address matches the first register of the computing device; means for determining a corrected translated return address based on the contents of the first register in response to determining that the provisional native return address does not match the first register; and means for jumping to the corrected translated return address in response to determining the corrected translated return address.

Example 34 includes the subject matter of any of Examples 26-33, and wherein the means for determining the corrected translated return address comprises means for determining whether a translated binary includes a translated return address for the native return address represented by the contents of the scratch register; and means for generating the translated binary including the translated return address as a function of a native binary in response to determining that the translated binary does not include the translated return address for the native return address represented by the contents of the scratch register.

Example 35 includes the subject matter of any of Examples 26-34, and further including means for executing a translated return routine of a translated binary, wherein the translated return routine corresponds to a native return instruction of a native binary; wherein the means for popping the native return address comprises means for popping the native return address in response to executing the translated return routine.

Example 36 includes the subject matter of any of Examples 26-35, and further including means for generating the translated binary as a function of the native binary, wherein the translated binary includes the translated return routine; and means for executing the translated binary; wherein the means for executing the translated return routine comprises means for executing the translated return routine in response to executing the translated binary.

The invention claimed is:

1. A computing device for shadow stack management, the computing device comprising:
   a call module to:
      push a native return address on to a native stack of the computing device;
      add a constant offset to a stack pointer of the computing device in response to pushing of the native return address on to the native stack;
      execute a native call instruction to a translated call target in response to addition of the constant offset to the stack pointer; and
      subtract the constant offset from the stack pointer in response to execution of the native call instruction; and
   a processor to push a translated return address on to a shadow stack of the computing device in response to execution of the native call instruction.

2. The computing device of claim 1, further comprising a memory management module to:
   map a plurality of virtual memory pages of the shadow stack onto a first physical memory page.

3. The computing device of claim 1, further comprising:
   a binary translation module to execute a translated call routine of a translated binary, wherein the translated call routine corresponds to a native call instruction of a native binary and the translated call target corresponds to a native call target of the native call instruction;
   wherein to push the native return address comprises to push the native return address in response to execution of the translated call routine.

4. The computing device of claim 3, wherein the binary translation module is further to:
   generate the translated binary as a function of the native binary, wherein the translated binary includes the translated call routine; and
   execute the translated binary;

wherein to execute the translated call routine comprises to execute the translated call routine in response to execution of the translated binary.

5. The computing device of claim 1, further comprising a binary translation module to check whether the stack pointer exceeds a pre-allocated virtual address range associated with the shadow stack in response to the addition of the constant offset to the stack pointer.

6. The computing device of claim 1, further comprising:
a return module to:
pop the native return address from the native stack of the computing device in response to subtraction of the constant offset from the stack pointer;
add the constant offset to the stack pointer in response to popping of the native return address from the native stack;
execute a native return instruction in response to addition of the constant offset to the stack pointer in response to the popping of the native return address from the native stack; and
subtract the constant offset from the stack pointer in response to execution of the native return instruction;
wherein the processor is further to pop the translated return address from the shadow stack in response to execution of the native return instruction.

7. The computing device of claim 6, further comprising:
a memory management module to map a plurality of virtual memory pages of the shadow stack onto a first physical memory page;
wherein the return module is further to validate the translated return address in response to execution of the native return instruction.

8. The computing device of claim 7, wherein:
to pop the native return address from the native stack comprises to pop the native return address into a first register of the computing device; and
to validate the translated return address comprises to:
determine a provisional native return address associated with the translated return address;
determine whether the provisional native return address matches the first register of the computing device;
determine a corrected translated return address based on the contents of the first register in response to a determination that the provisional native return address does not match the first register; and
jump to the corrected translated return address in response to determination of the corrected translated return address.

9. The computing device of claim 8, wherein to determine the corrected translated return address comprises to:
determine whether a translated binary includes a translated return address for the native return address represented by the contents of the scratch register; and
generate the translated binary including the translated return address as a function of a native binary in response to a determination that the translated binary does not include the translated return address for the native return address represented by the contents of the scratch register.

10. The computing device of claim 6, further comprising:
a binary translation module to execute a translated return routine of a translated binary, wherein the translated return routine corresponds to a native return instruction of a native binary;
wherein to pop the native return address comprises to pop the native return address in response to execution of the translated return routine.

11. The computing device of claim 10, further comprising:
a binary translation module to (i) generate the translated binary as a function of the native binary, wherein the translated binary includes the translated return routine and (ii) execute the translated binary;
wherein to execute the translated return routine comprises to execute the translated return routine in response to execution of the translated binary.

12. A method for shadow stack management, the method comprising:
pushing, by a computing device, a native return address on to a native stack of the computing device;
adding, by the computing device, a constant offset to a stack pointer of the computing device in response to pushing the native return address on to the native stack;
executing, by the computing device, a native call instruction to a translated call target in response to adding the constant offset to the stack pointer, wherein executing the native call instruction comprises pushing a translated return address on to a shadow stack of the computing device; and
subtracting, by the computing device, the constant offset from the stack pointer in response to executing the native call instruction.

13. The method of claim 12, further comprising:
mapping, by the computing device, a plurality of virtual memory pages of the shadow stack onto a first physical memory page.

14. The method of claim 12, further comprising:
executing, by the computing device, a translated call routine of a translated binary, wherein the translated call routine corresponds to a native call instruction of a native binary and the translated call target corresponds to a native call target of the native call instruction;
wherein pushing the native return address comprises pushing the native return address in response to executing the translated call routine.

15. The method of claim 12, further comprising:
popping, by the computing device, the native return address from the native stack of the computing device in response to subtracting the constant offset from the stack pointer;
adding, by the computing device, the constant offset to the stack pointer in response to popping the native return address from the native stack;
executing, by the computing device, a native return instruction in response to adding the constant offset to the stack pointer in response to popping the native return address from the native stack, wherein executing the native return instruction comprises popping the translated return address from the shadow stack; and
subtracting, by the computing device, the constant offset from the stack pointer in response to executing the native return instruction.

16. The method of claim 15, further comprising:
mapping, by the computing device, a plurality of virtual memory pages of the shadow stack onto a first physical memory page; and
validating, by the computing device, the translated return address in response to executing the native return instruction.

17. The method of claim 16, wherein:
popping the native return address from the native stack comprises popping the native return address into a first register of the computing device; and validating the translated return address comprises:
  determining a provisional native return address associated with the translated return address;
  determining whether the provisional native return address matches the first register of the computing device;
  determining a corrected translated return address based on the contents of the first register in response to determining that the provisional native return address does not match the first register; and
  jumping to the corrected translated return address in response to determining the corrected translated return address.

18. The method of claim 15, further comprising:
  executing, by the computing device, a translated return routine of a translated binary, wherein the translated return routine corresponds to a native return instruction of a native binary;
  wherein popping the native return address comprises popping the native return address in response to executing the translated return routine.

19. One or more non-transitory computer-readable storage media comprising a plurality of instructions that in response to being executed cause a computing device to:
  push a native return address on to a native stack of the computing device;
  add a constant offset to a stack pointer of the computing device in response to pushing the native return address on to the native stack;
  execute a native call instruction to a translated call target in response to adding the constant offset to the stack pointer, wherein executing the native call instruction comprises pushing a translated return address on to a shadow stack of the computing device; and
  subtract the constant offset from the stack pointer in response to executing the native call instruction.

20. The one or more computer-readable storage media of claim 19, further comprising a plurality of instructions that in response to being executed cause the computing device to:
  map a plurality of virtual memory pages of the shadow stack onto a first physical memory page.

21. The one or more computer-readable storage media of claim 19, further comprising a plurality of instructions that in response to being executed cause the computing device to:
  execute a translated call routine of a translated binary, wherein the translated call routine corresponds to a native call instruction of a native binary and the translated call target corresponds to a native call target of the native call instruction;
  wherein to push the native return address comprises to push the native return address in response to executing the translated call routine.

22. The one or more computer-readable storage media of claim 19, further comprising a plurality of instructions that in response to being executed cause the computing device to:
  pop the native return address from the native stack of the computing device in response to subtracting the constant offset from the stack pointer;
  add the constant offset to the stack pointer in response to popping the native return address from the native stack;
  execute a native return instruction in response to adding the constant offset to the stack pointer in response to popping the native return address from the native stack, wherein executing the native return instruction comprises popping the translated return address from the shadow stack; and
  subtract the constant offset from the stack pointer in response to executing the native return instruction.

23. The one or more computer-readable storage media of claim 22, further comprising a plurality of instructions that in response to being executed cause the computing device to:
  map a plurality of virtual memory pages of the shadow stack onto a first physical memory page; and
  validate the translated return address in response to executing the native return instruction.

24. The one or more computer-readable storage media of claim 23, wherein:
  to pop the native return address from the native stack comprises to pop the native return address into a first register of the computing device; and
  to validate the translated return address comprises to:
    determine a provisional native return address associated with the translated return address;
    determine whether the provisional native return address matches the first register of the computing device;
    determine a corrected translated return address based on the contents of the first register in response to determining that the provisional native return address does not match the first register; and
    jump to the corrected translated return address in response to determining the corrected translated return address.

25. The one or more computer-readable storage media of claim 22, further comprising a plurality of instructions that in response to being executed cause the computing device to:
  execute, a translated return routine of a translated binary, wherein the translated return routine corresponds to a native return instruction of a native binary;
  wherein to pop the native return address comprises to pop the native return address in response to executing the translated return routine.

* * * * *